United States Patent [19]

Haverland

[11] 4,204,651
[45] May 27, 1980

[54] REEL ASSEMBLY

[76] Inventor: Joseph G. Haverland, 516 Tallow Ct., Chula Vista, Calif. 92011

[21] Appl. No.: 4,142

[22] Filed: Jan. 17, 1979

[30] Foreign Application Priority Data

Apr. 4, 1978 [TW] Taiwan .................................. 6721096

[51] Int. Cl.² ............................................. B65H 75/40
[52] U.S. Cl. ................................. 242/96; 242/84.5 R; 242/99
[58] Field of Search .................... 242/96, 99, 100, 156, 242/84.8, 156.2, 84.51 R, 84.5 R; 244/153 R, 155 A

[56] References Cited

U.S. PATENT DOCUMENTS

| 522,503 | 7/1894 | DeBem | 242/99 X |
| 923,559 | 6/1909 | Moser | 242/99 |
| 1,123,642 | 1/1915 | Wright | 242/99 |
| 4,106,719 | 8/1978 | Haverland | 242/96 |

Primary Examiner—Edward J. McCarthy
Attorney, Agent, or Firm—William F. Frank

[57] ABSTRACT

An improved reel assembly having fixed parts that are pressed together to form a frame and including a spool rotatable within the assembled frame, a crank connected to said spool and braking means on the opposite side of the spool from the crank.

3 Claims, 11 Drawing Figures

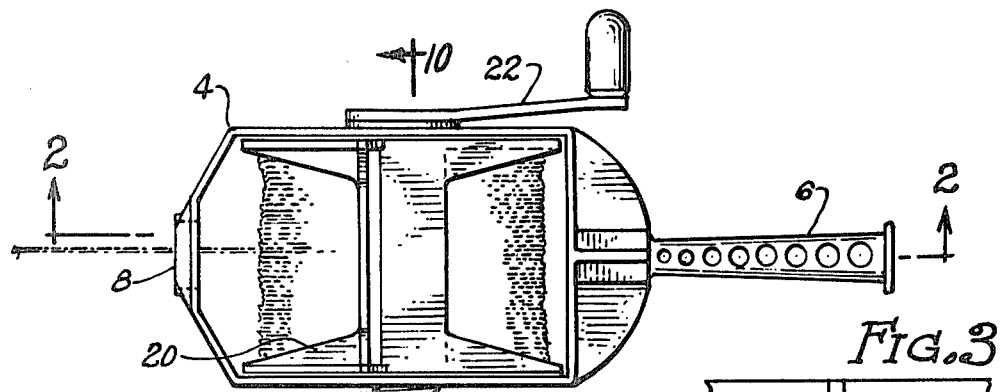
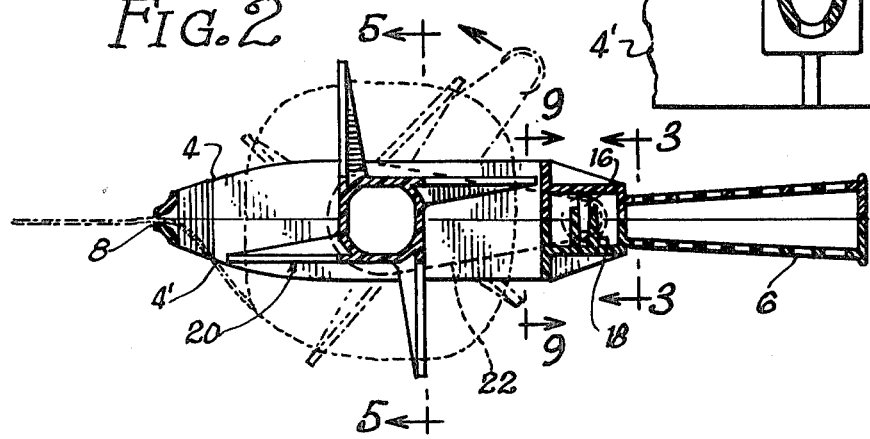
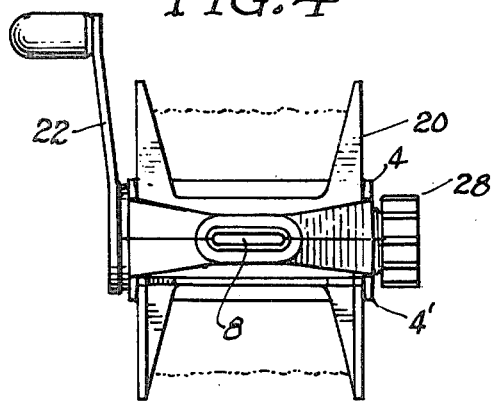
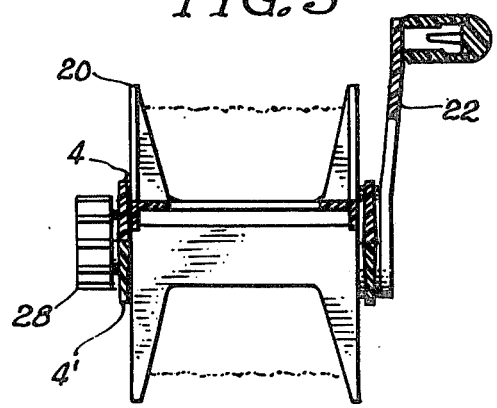

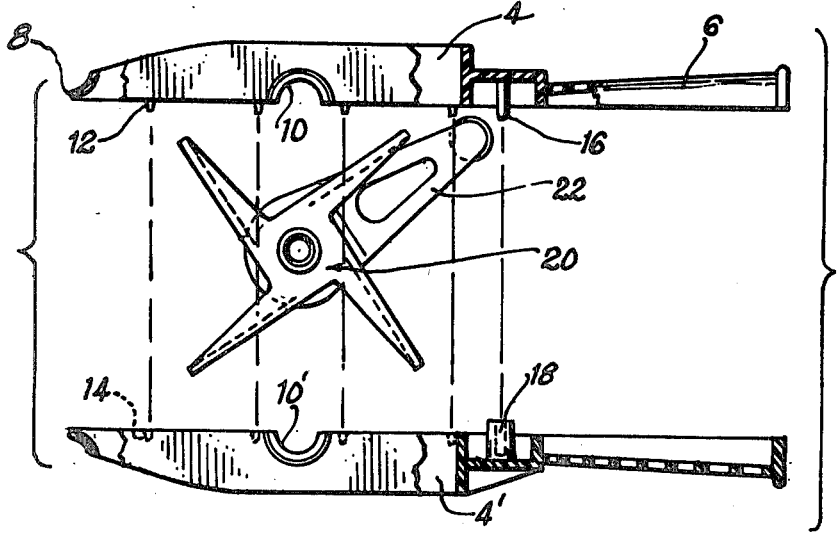
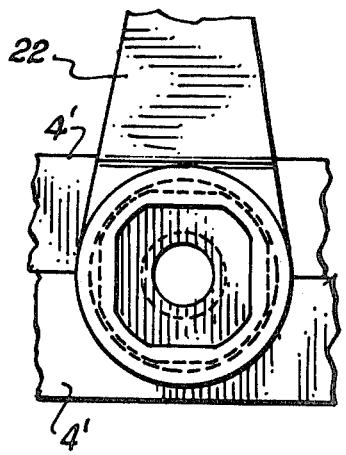
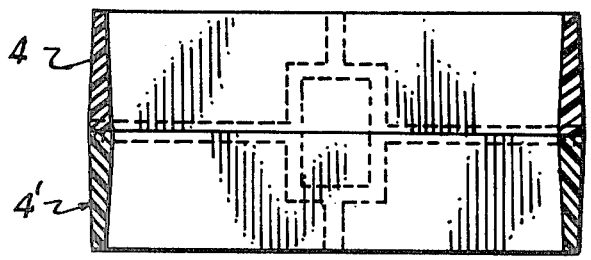
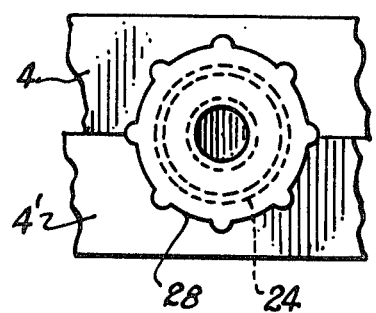

REEL ASSEMBLY

RELATED PRIOR ART

The present invention is an improvement over a reel assembly disclosed in applicant's U.S. Pat. No. 4,106,719, the contents of which are incorporated in their entirety herein by reference thereto.

BACKGROUND OF THE INVENTION

The reel assembly in the above-mentioned patent can satisfactorily be employed with kites to control the outflow of kite line and also controlling the outflow of line when used for such purposes as fishing, retreating, or trolling weights and the like. However, it has been found that when the force applied to the object at the end of the line is considerable, as for example, when attempting to allow heavy weight to be slowly paid out into water, or to assist a person descending from a great height or the like, that the torque produced by braking the line places an undesirable strain upon the frame of the assembly within which the spool containing the line is mounted. The braking unit in the aforementioned patent is of a drum-type which comprises complimentary tapering surfaces, one of which is drawn into the other to force the outer surface into contact with the body frame. The problem of torque could be overcome by increasing the weight and structure of the frame, but it was discovered that a change in the braking system whereby the torque resulting from the brake action can be converted from a rotary torque to an axial force directed against the sides of the frame and the reel.

SUMMARY OF THE PRESENT INVENTION

The present invention utilizes the structure of the assembly as set forth in the aforementioned patent; that is, the assembly consists of two opposing body sections having aligning pins and recesses for exact abutment which are cemented together with a rotary spool operatively mounted therebetween. Integral with one end of the spool is a handle for rotation of the spool, and there is also a handle on the frame to provide leverage for casting a line from the assembly as well as for maneuvering in and holding it during the wind-up and outflow of line, and a disc-type braking system which provides positive control of the line on the reel without stress on the assembly.

DESCRIPTION OF THE DRAWING

The present invention and its preferred embodiment may be seen in the drawings wherein:

FIG. 1 is a top plan view of the present invention.

FIG. 2 is a side elevation thereof showing, by dotted lines and arrow, the line, spool and crank action.

FIG. 3 is a cross sectional detail of the handle taken along line 3—3 of FIG. 2.

FIG. 4 is an elevation view of the line discharge end.

FIG. 5 is an elevation view of the moving parts of the assembly taken along line 5—5 of FIG. 2.

FIG. 6 is an exploded view of the invention seen in FIG. 1.

FIG. 7 is a fragmentary view of the end of the spool and body portion taken from the side having the crank.

FIG. 8 is the same as that of FIG. 7 but taken from the opposite, i.e. the brake side.

FIG. 9 is a cross sectional view taken along line 9—9 of FIG. 2.

DESCRIPTION OF PREFERRED EMBODIMENT

Figure 10:
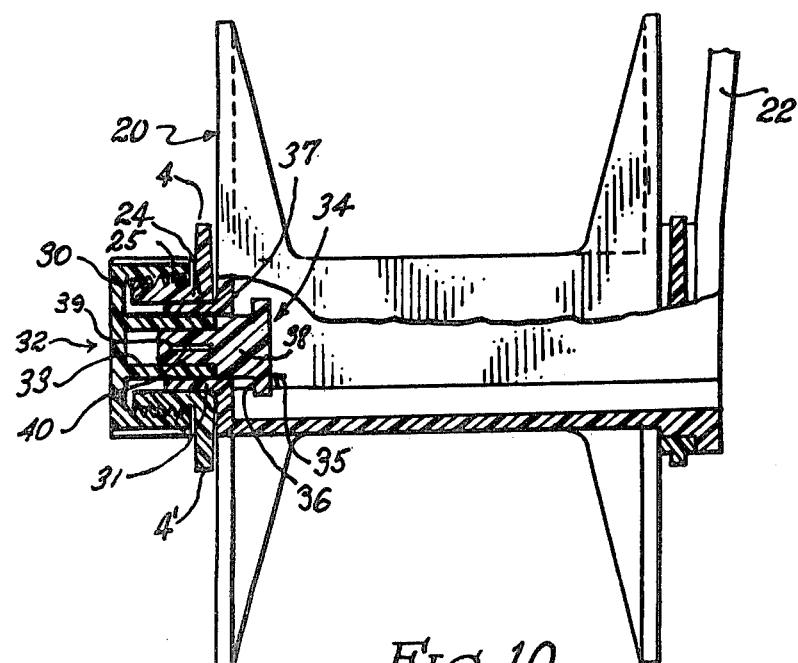
FIG. 10 is a partial cross-sectional view along the line 10—10 in FIG. 1 showing the braking unit disengaged.

In the accompanying drawings wherein like reference numbers represent like parts throughout the numeral 4 is a substantially rectangular upper body member. An upper surface is slightly arcuate at one end and the opposite surface is flat with a plurality of bosses 12. Item 4 is preferably hollowed out and has two like semicircular recesses 10 centrally along each side. At the arcuate end, I have provided a substantially rectangular aperture 8 and at the opposite end I have provided an additional protrusion 16 of greater dimensions than the bosses for added strength and alignment. It is preferably of illustrated configuration. The exterior portion is substantially a flat space for printed indicia. Integral therewith and depending from the described parts is a substantially hollow semi-elipsoid shaped member 6, preferably provided with a plurality of orifices along and through its walls.

For cementing therewith, I have provided like counter parts indicated as lower body member 4', except that instead of bosses and extended protrusions, I have provided a plurality of recesses 14 to receive the bosses 12. Adjacent thereto is protrusion receptable 18 to receive item 16. As can be seen in FIG. 6, when the two body members are united at their respective flat surfaces, they form the body portion of my device. Opposite item 10 is a like semi-circular recess 10' of lower body member 4'. Together they form the bearing surfaces in which the rotor 20 is rotatably mounted.

The rotor preferably has four flanges on each side to retain the string. A crank 22 is secured at one end of the rotor where it protrudes from the body portion and a handle is at the opposite end for manually winding the string.

The lower body member also has a rectangular aperture to match that of the upper member. Together they form a line guide aperature with space for the operator to move the device from side to side for uniform placement of string on the spool. See FIG. 4.

At the opposite end of the lower body member is also an semi-elipsoid shaped member with orifices that align with those of item 6. Together they unite to form a handle with oval cross section as in FIG. 3.

Figure 11:
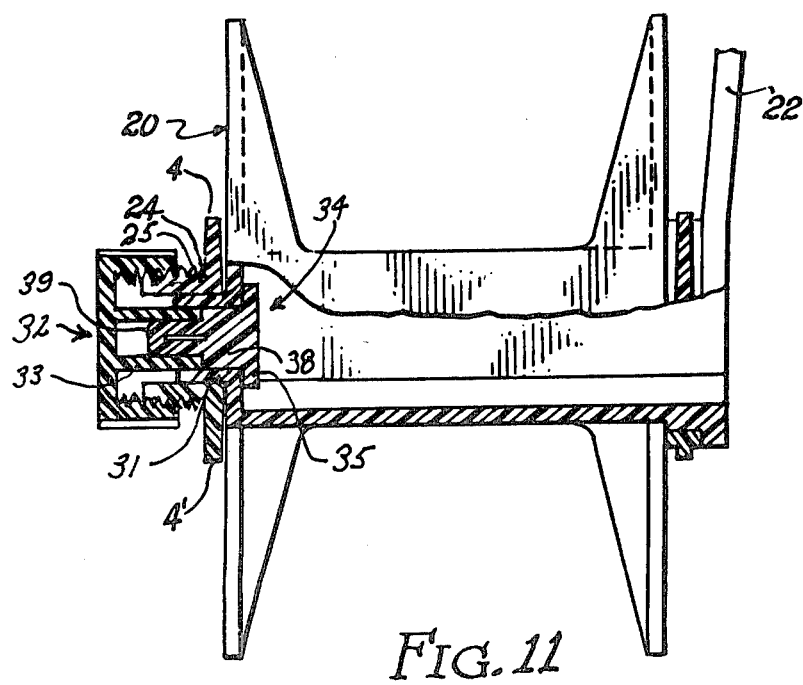
FIG. 11 is the same as FIG. 10 but showing the braking unit engaged.

The braking assembly embodiment as shown in FIGS. 10 and 11 functions more in the manner of a disc-type brake. The showing in FIG. 10 is of the present embodiment in a position allowing free rotation of the spool assembly within the body frame. The showing in FIG. 11 is of the present embodiment braking assembly in braking relationship with the spool assembly. In this present embodiment, a hollow axial outward extension 31 is formed on the end of the spool assembly opposite the end having the crank 22. The frame 4' again carries the hollow semi-circular outward axial extension 24 with exterior threads 25 on the outer portion. In this present embodiment, the braking assembly is in two parts. One part is the knurled cap 32 having the same interior threads 30 as in the embodiment shown in my patent. Cap 32 is formed with a hollow cylindrical inwardly extending body 33 on the interior surface of its cap. The other part of the braking assembly of this embodiment is the brake element 34. The brake element 34 has a cylindrical disc 35 mounted on its end which is within the spool assembly. The disc 35 has a bearing surface 36 which is annular in form and which acts as a braking disc when the braking assembly in this embodiment is activated by contacting inner surface 37 of the spool assembly. Brake element 34 is secured to the threaded cap 32 after the spool assembly has been assembled within the body frame by means of extension 39, force fitted within the interior of the cylindrical extension 33 of cap 32. The extension 39 contains a plurality of recesses 40 into which adhesive is placed so as to provide a secure bonding of the brake element 34 within the threaded cap 32. Joining the extension 39 to the braking disc 35 is a circular bearing portion 38 which provides additional bearing surface for the axial extension 31 of the spool assembly. As shown in FIG. 10, the cap 32 has been turned down on threads 25 of frame extension 24 so that the braking surface 36 of the brake disc 35 is out of contact with the interior surface 37 of the spool assembly. In FIG. 11, the braking assembly has been actuated so as to apply at least some frictional engagement between the braking disc 35 and the spool assembly and the frame. To accomplish this, the threaded cap with its secured brake element 34 is rotated counterclockwise until braking surface 36 is brought into contact with inner vertical surface 37 of the spool assembly. As threaded cap 32 continues to be turned counterclockwise, the braking surface 36 is brought into increased frictional engagement with surface 37. If this frictional engagement is not sufficient to provide the desired control of the rotation of the spool assembly 20, additional counterclockwise turning of the threaded cap 32 will bring the spool assembly 20 into contact with the frame 4 and 4' of the body assembly thus completely stopping the rotation of the spool assembly.

As can be seen from the present embodiment, the amount of friction applied to the spool assembly can be controlled by turning the knurled knob, and the drag on the dragstring can thereby be varied at will.

What is claimed is:

1. A reel assembly for storage of lines and the like comprising in combination:

a line storage spool assembly having at each end four flanges formed integrally thereon to retain the line on the spool, one end of said spool having a crank with a handle formed thereon, the opposite end of said spool having an axial, outwardly-directed, hollow extension which has a cylindrical outer bearing surface;

a pair of oppositely disposed body members which are secured together to form the body portion of said assembly, each of said body members having semi-circular recesses on body sides which form bearing surfaces for said spool to be rotatably mounted, each of the body members further having on one and the same side a hollow, semi-circular, thread-bearing frame extension extending outwardly and receiving said spool axial extension when said body members are assembled about said spool; and frictional brake means operatively mounted on said frame extension and having at least one surface which cooperates with the inner vertical surface of said spool assembly when said brake means is turned on its mounting on said nipple to wedge said spool assembly into frictional engagement with said body portion to control the rotation of said spool assembly.

2. The device according to claim 1 wherein said spool extension has a cylindrical inner surface and said braking means comprises a cap with interior threads engaging the threads on said frame extension, said cap having an interiorly extending hollow cylindrical portion into which is secured a braking disc which is brought into contact with said spool assembly when said knob is turned counterclockwise and which braking disc brings said spool assembly into frictional engagement with said body portion.

3. The reel assembly according to claim 1 wherein each of said body members has a rectangular aperture at one end and a semi-ellipsoid extension at the opposite end to form a line guide at said one end and a handle at said opposite end when said body members are secured together to form said body portion.

* * * * *